(12) United States Patent
Ciot

(10) Patent No.: US 8,060,543 B1
(45) Date of Patent: Nov. 15, 2011

(54) TRACKING SOFTWARE OBJECT USE

(75) Inventor: Thierry Gaëtan Ciot, Hollis, NH (US)

(73) Assignee: Micro Focus (IP) Limited, Newbury (GB)

( * ) Notice: Subject to any disclaimer, the term of this patent is extended or adjusted under 35 U.S.C. 154(b) by 247 days.

(21) Appl. No.: 11/119,427

(22) Filed: Apr. 29, 2005

(51) Int. Cl.
*G06F 7/00* (2006.01)

(52) U.S. Cl. ...................................... 707/820

(58) Field of Classification Search ............... 707/206
See application file for complete search history.

(56) References Cited

U.S. PATENT DOCUMENTS

| | | | | |
|---|---|---|---|---|
| 5,461,611 A * | 10/1995 | Drake et al. | | 370/420 |
| 6,070,202 A * | 5/2000 | Minkoff et al. | | 710/56 |
| 6,301,616 B1 * | 10/2001 | Pal et al. | | 709/226 |
| 6,560,773 B1 * | 5/2003 | Alexander et al. | | 717/128 |
| 6,574,717 B1 * | 6/2003 | Ngai et al. | | 711/147 |
| 6,611,858 B1 * | 8/2003 | Aravamudan et al. | | 709/203 |
| 6,658,653 B1 * | 12/2003 | Bates et al. | | 717/131 |
| 6,701,520 B1 * | 3/2004 | Santosuosso et al. | | 717/152 |
| 6,917,898 B1 * | 7/2005 | Kirubalaratnam et al. | | 702/179 |
| 7,178,143 B2 | 2/2007 | Pugh et al. | | |
| 7,188,344 B1 * | 3/2007 | Blue | | 718/106 |
| 7,290,048 B1 * | 10/2007 | Barnett et al. | | 709/223 |
| 2003/0200530 A1 * | 10/2003 | Sayag | | 717/114 |
| 2004/0158589 A1 * | 8/2004 | Liang et al. | | 707/206 |
| 2004/0230763 A1 * | 11/2004 | Cohen et al. | | 711/170 |
| 2005/0081190 A1 * | 4/2005 | Betancourt et al. | | 717/124 |
| 2005/0091646 A1 * | 4/2005 | Chilimbi et al. | | 717/130 |
| 2005/0172271 A1 * | 8/2005 | Spertus et al. | | 717/125 |
| 2005/0235054 A1 * | 10/2005 | Kadashevich | | 709/223 |
| 2006/0075007 A1 * | 4/2006 | Anderson et al. | | 707/206 |

* cited by examiner

*Primary Examiner* — Tim T Vo
*Assistant Examiner* — Aaron Sanders
(74) *Attorney, Agent, or Firm* — Kokka & Backus, PC

(57) ABSTRACT

Tracking resource use includes determining when the resource is allocated, determining when the resource is first used, determining when the resource is last used, and determining when the resource is deallocated. The resource may be a software object. Deallocating the resource may be performed automatically by a run time system when there are no remaining references to the object in run time code or variables. Deallocating the resource may include at least one of: setting a flag for the resource and adding an identifier for the resource to a list of resources to be deallocated. Time measurements may correspond to a count of garbage collection cycles. Tracking resource use may also include determining additional resource usage metrics.

16 Claims, 12 Drawing Sheets

| Name | Useful Existence (D1) | Delayed Object Use (D2) | Object Retention (D3) | Object Not Used (D4) | MEM RATIO 1 (D1/D2) | MEM RATIO 2 (D1/D4) |
|---|---|---|---|---|---|---|
| | | | | | | |
| | | | | | | |
| | | | | | | |
| | | | | | | |
| | | | | | | |

FIGURE 4

| Name | ΔUseful Existence (D1) | ΔDelayed Object Use (D2) | ΔObject Retention (D3) | ΔObject Not Used (D4) | ΔMEM RATIO 1 (D1/D2) | ΔMEM RATIO 2 (D1/D4) |
|---|---|---|---|---|---|---|
| | | | | | | |
| | | | | | | |
| | | | | | | |
| | | | | | | |

FIGURE 5

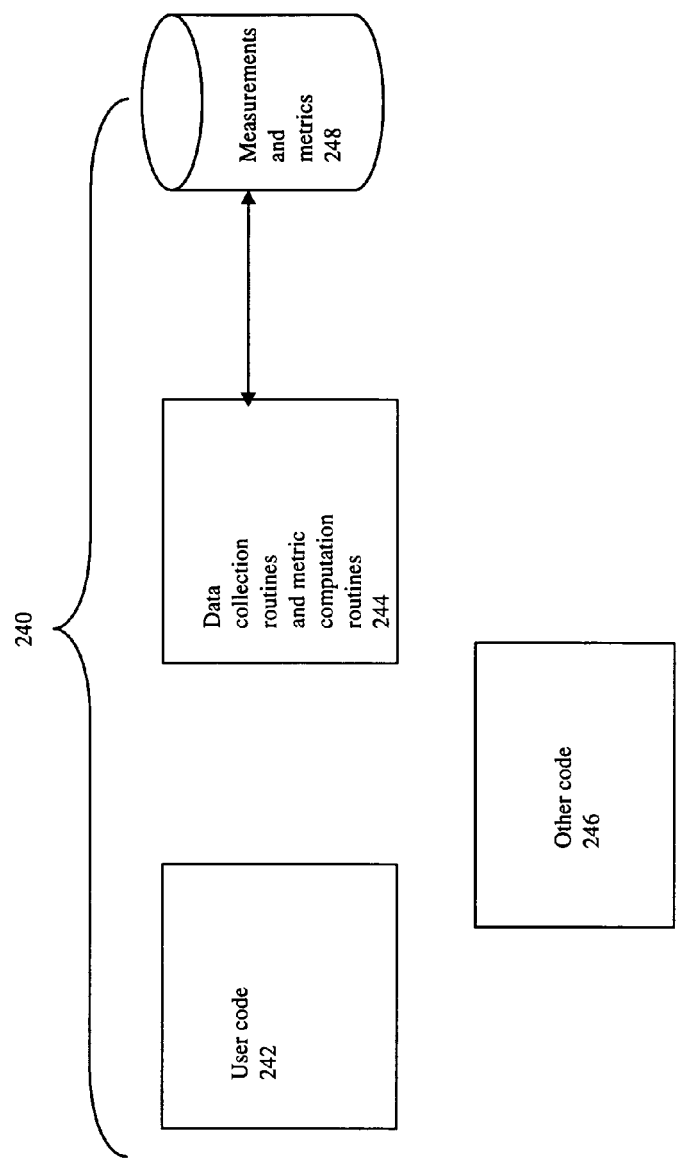

TRACKING SOFTWARE OBJECT USE

BACKGROUND OF THE INVENTION

1. Technical Field

This application relates to computer software, and more particularly to the field of tracking use of objects in software.

2. Description of Related Art

Computer software programs create, use, and discard software objects at run time and, in some cases, according to run time conditions. When objects are created, memory is allocated for use. Objects which are not discarded, such as by performing garbage collection, may result in inefficient memory usage. Inefficient memory usage by a program may create performance and scalability problems.

Current memory diagnostic tools may provide memory footprint analysis resulting in a current view of allocated objects. Memory analysis tools may provide a view of what memory is allocated that may never be used and/or referenced, or memory which is never deallocated by a program. However, existing techniques may not provide for automatically measuring and quantifying the memory usage of objects that have remained allocated for too long or objects that have been allocated too early. For example, various user interactions may be required to obtain each current view or snapshot at different points in time. Additionally, it may not be easy to determine or quantify a difference between memory usage associated with each snapshot or view.

It is desirable to provide a technique which gives insight into memory usage, such as for objects, for an arbitrary period of time of a program's lifetime in an automated fashion. It is also desirable that this technique provide a mechanism to easily quantify memory quality and efficiency. It is also desirable that this technique be generally applicable for use with different resources in addition to object memory usage.

SUMMARY OF THE INVENTION

According to the present invention, tracking resource use includes determining when the resource is allocated, determining when the resource is first used, determining when the resource is last used, and determining when the resource is deallocated. The resource may be a software object. Deallocating the resource may be performed automatically by a run time system when there are no remaining references to the object in run time code or variables. Time measurements may correspond to at least one of: a count of garbage collection cycles, a number of method calls since the beginning of program execution, and actual time. Deallocating the resource may include at least one of: setting a flag for the resource and adding an identifier for the resource to a list of resources to be deallocated. Tracking resource use may also include determining additional resource usage metrics. The additional resource usage metrics may be provided by one or more value from the following group: object useful existence corresponding to a difference between when the resource is last used and when the resource is first used, delayed object use duration corresponding to a difference between when the resource is first used and when the resource is allocated, object retention duration corresponding to a difference between when the resource is deallocated and when the resource is last used, an object not used duration corresponding to a sum of the delayed object use duration and the object not used duration, a first memory ratio of the object useful existence duration to the delayed object use duration, and a second memory ratio of the object useful existence duration to the object not used duration. Tracking resource use may also include displaying to a user the additional resource usage metrics. Tracking resource use may also include determining a first set of the additional resource usage metrics, determining a second set of the additional resource usage metrics, where for each of the usage metrics of the first set, there is a corresponding usage metric of the second set measured at different time, and displaying to a user a difference between the first set and the second set of additional resource usage metrics.

According further to the present invention, computer software, stored in a computer-readable medium, includes executable code that determines when the resource is allocated, executable code that determines when the resource is first used, executable code that determines when the resource is last used, and executable code that determines when the resource is deallocated. The resource may be a software object. Executable code that deallocates the resource may be part of a run time system that automatically deallocates the resource when there are no remaining references to the object in run time code or variables. Time measurements may correspond to at least one of: a count of garbage collection cycles, a number of method calls since the beginning of program execution, and actual time. Executable code that deallocates the resource may include at least one of: executable code that sets a flag for the resource and executable code that adds an identifier for the resource to a list of resources to be deallocated. The computer software may also include executable code that determines additional resource usage metrics. The additional resource usage metrics may be provided by one or more value from the following group: object useful existence corresponding to a difference between when the resource is last used and when the resource is first used, delayed object use duration corresponding to a difference between when the resource is first used and when the resource is allocated, object retention duration corresponding to a difference between when the resource is deallocated and when the resource is last used, an object not used duration corresponding to a sum of the delayed object use duration and the object not used duration, a first memory ratio of the object useful existence duration to the delayed object use duration, and a second memory ratio of the object useful existence duration to the object not used duration. The computer software may include executable code that displays to a user the additional resource usage metrics. The computer software may include executable code that determines a first set of the additional resource usage metrics, executable code that determines a second set of the additional resource usage metrics, where for each of the usage metrics of the first set, there is a corresponding usage metric of the second set measured at different time, and executable code that displays to a user a difference between the first set and the second set of additional resource usage metrics.

BRIEF DESCRIPTION OF DRAWINGS

FIGS. 4 and 5 illustrate tables of metrics that may be computed in connection with objects using the techniques and measurements according to an embodiment of the system described herein.

FIG. 6B illustrates components that may be included in connection with the techniques described herein for object tracking according to an embodiment of the system described herein.

DETAILED DESCRIPTION OF VARIOUS EMBODIMENTS

Figure 1:
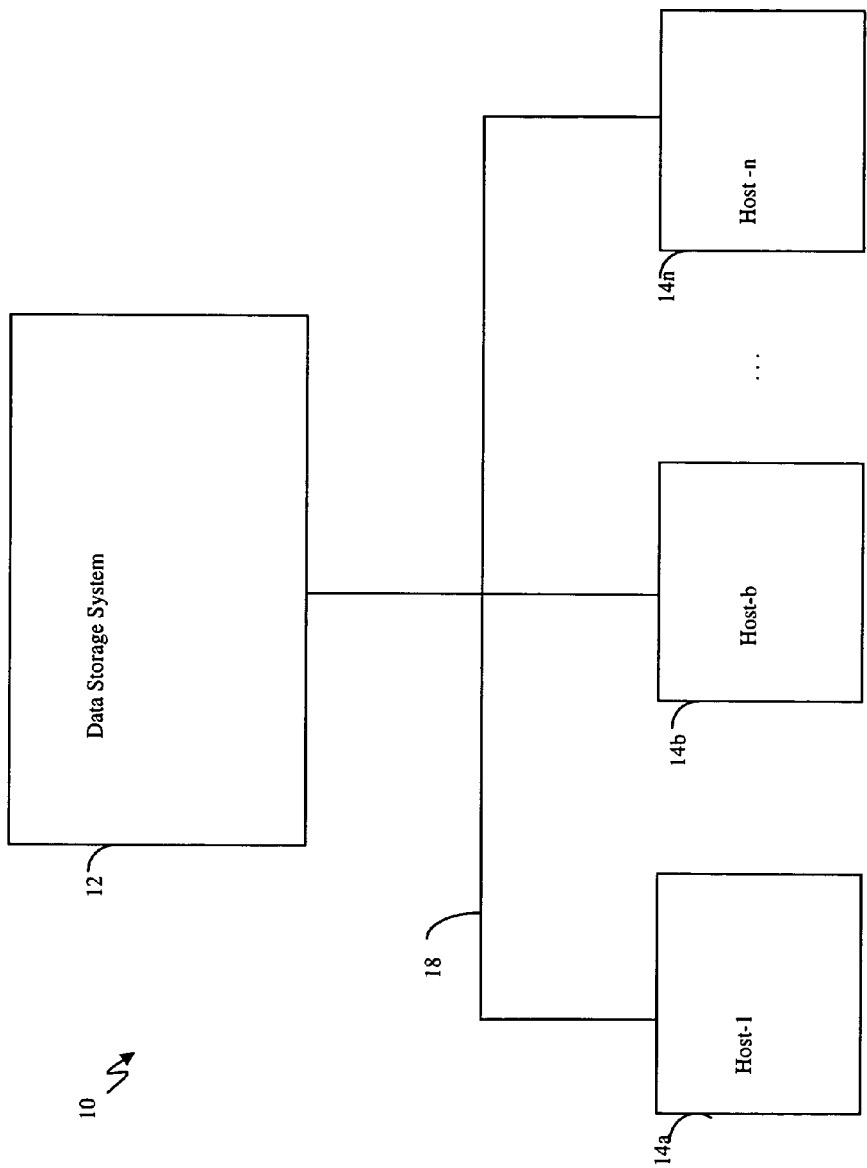
FIG. 1 illustrates a computer system that may be used in performing techniques according to an embodiment of the system described herein.

Referring to FIG. 1, a computer system 10 includes a data storage system 12 connected to a plurality of host systems 14a-14n through a communication medium 18. In this embodiment, the N hosts 14a-14n may access the data storage system 12, for example, in connection with performing input/output (I/O) operations or data requests. The communication medium 18 may be any one of a variety of networks or other type of communication connections as known to those skilled in the art. The communication medium 18 may be a network connection, bus, and/or other type of data link, such as a hardwire, wireless, or other connection known in the art. For example, the communication medium 18 may be the Internet, an intranet, network or other connection(s) by which the host systems 14a-14n may access and communicate with the data storage system 12, and may also communicate with others included in the computer system 10.

Each of the host systems 14a-14n and the data storage system 12 included in the computer system 10 may be connected to the communication medium 18 by any one of a variety of connections as may be provided and supported in accordance with the type of communication medium 18. Each of the processors included in the host computer systems 14a-14n may be any one of a variety of commercially available single or multi-processor system, such as an INTEL-based processor, IBM mainframe or other type of commercially available processor able to support incoming traffic in accordance with each particular embodiment and application.

It should be noted that the particulars of the hardware and software included in each of the host systems 14a-14n, as well as those components that may be included in the data storage system 12, are described herein in more detail, and may vary with each particular embodiment. Each of the host computers 14a-14n may all be located at the same physical site, or, alternatively, may also be located in different physical locations. Examples of the communication medium that may be used to provide the different types of connections between the host computer systems and the data storage system of the computer system 10 may use a variety of different communication protocols such as SCSI, Fibre Channel, or GIGE (Gigabit Ethernet), and the like. Some or all of the connections by which the hosts and data storage system 12 may be connected to the communication medium 18 may pass through other communication devices, such as switching equipment that may exist such as a phone line, a repeater, a multiplexer or even a satellite.

Each of the host computer systems may perform different types of data operations in accordance with different types of tasks. In the embodiment of FIG. 1, any one of the host computers 14a-14n may issue a data request to the data storage system 12 to perform data operations.

Figure 2:
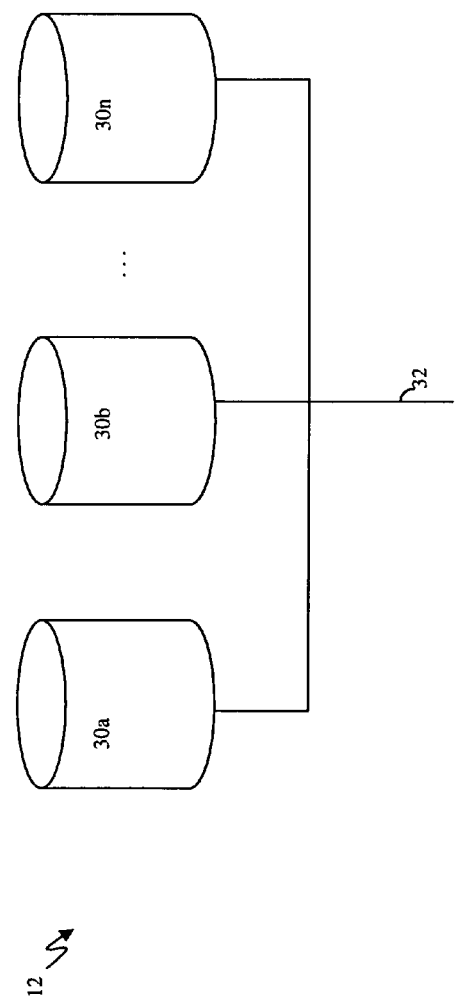
FIG. 2 illustrates a data storage system of the computer system of FIG. 1 according to an embodiment of the system described herein

Referring to FIG. 2, a data storage system 12 may be included in the computer system 10 of FIG. 1. The data storage system 12 in this example may include a plurality of data storage devices 30a-30n. The data storage devices 30a-30n may communicate with components external to the data storage system 12 using a communication medium 32. Each of the data storage devices may be accessible to the hosts 14a-14n using an interface connection between the communication medium 18 (described above) and the communication medium 32. It should be noted that the communication medium 32 may be any one of a variety of different types of connections and interfaces used to facilitate communication between communication medium 18 and each of the data storage devices 30a-30n.

The data storage system 12 may include any number and type of data storage devices. For example, the data storage system may include a single device, such as a disk drive, as well as a plurality of devices in a more complex configuration, such as with a storage area network and the like. Data may be stored, for example, on magnetic, optical, or silicon-based media. The particular arrangement and configuration of a data storage system may vary in accordance with the parameters and requirements associated with each embodiment.

Each of the data storage devices 30a-30n may be characterized as a resource included in an embodiment of the computer system 10 to provide storage services for the host computer systems 14a-14n. The devices 30a-30n may be accessed using any one of a variety of different techniques. In one embodiment, the host systems may access the data storage devices 30a-30n using logical device names or logical volumes. The logical volumes may or may not correspond to the actual data storage devices. For example, one or more logical volumes may reside on a single physical data storage device such as 30a. Data in a single data storage device may be accessed by one or more hosts allowing the hosts to share data residing therein.

Figure 3:
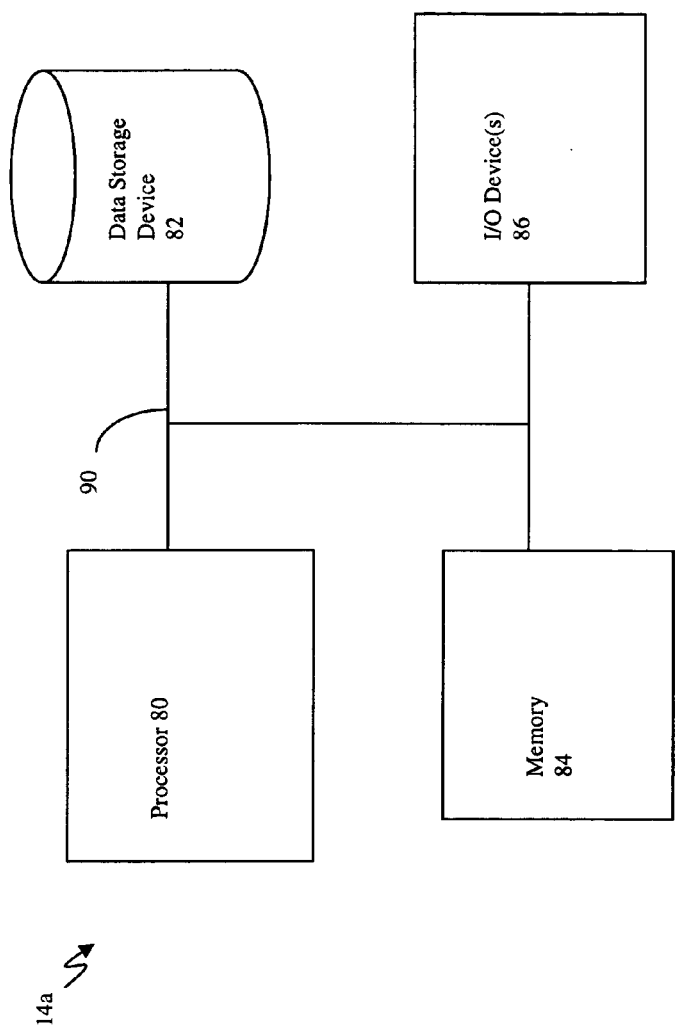
FIG. 3 illustrates components that may be included in a host system of the computer system of FIG. 1 according to an embodiment of the system described herein.

Referring to FIG. 3, shown is an example a possible host or user system 14a. It should be noted that although a particular configuration of a host system is described herein, other host systems 14b-14n may also be similarly or differently configured. Additionally, it should be noted that each host system 14a-14n may have any one of a variety of different configurations including different hardware and/or software components. The host system 14a includes a processor 80, a memory, 84, one or more I/O devices 86 and one or more data storage devices 82 that may be accessed locally within the host system 14a. Each of the foregoing may communicate using a bus or other communication medium 90. Each of the foregoing components may be any one of more of a variety of different types in accordance with the particular host system 14a.

Computer instructions may be executed by the processor 80 to perform a variety of different operations. As known in the art, executable code may be produced, for example, using a loader, a linker, a language processor, and other tools that may vary in accordance with each embodiment. Computer instructions and data may also be stored on a data storage device 82, ROM, or other form of media or storage. The instructions may be loaded into memory 84 and executed by processor 80 to perform a particular task. The instructions may be executed directly by the processor 80 (e.g., in the case of code that is compiled and linked) or the instructions may be interpreted by an interpreter that executes directly on the processor 80.

A computer program may contain instructions that perform tasks such as, for example, creation, use, and disposal of objects. As known to those skilled in the art, a program may perform operations in connection with objects. The program may be written using any one or more programming languages such as, for example, JAVA, C++, C#, VB.Net, and the like. Programs, such as those which are object oriented programs, may be characterized as utilizing a collection of objects which interact with one another. When objects are created, memory is consumed. When objects are no longer in use by a program, it may be desirable to destroy, dispose, or otherwise have the memory associated with an object available for reuse. When the lifetime of an object within a program is longer than actually needed or if an object is allocated too early or not used, performance and scalability issues may result.

The system described herein may be used in connection with tracking object use by a program. The system may be used, for example, to discover unused memory objects. Additionally, the system described herein may be used to define one or more memory metrics that may be used, for example, to measure a program's efficiency or improvement regarding memory usage in connection with objects. Such metrics may be also be used to test and verify that software is optimized to a defined threshold. The foregoing will become apparent to those of ordinary skill in the art based on the description herein.

An object may no longer be needed when there are no further references to that particular object from other objects in the system, and no references in any local variables on the method call stack. Garbage collection techniques are known to those of ordinary skill in the art and may be characterized, for example, as techniques used in connection with freeing memory or allocated objects (i.e., deallocating the objects) that are no longer referenced and/or that have been marked for disposal. For example, a JAVA run time system may perform garbage collection for objects that are no longer referenced by any run time code or variables. Other programming languages may use explicit memory management and garbage collection techniques, for example, where the programmer (i.e., the executing program) may be responsible for disposing of unused memory blocks by setting a flag for the object or calling a routine that compiles a list or otherwise keeps track of objects that are to be garbage collected.

Insight into object memory usage may be determined by measuring various times associated with an object. Times that may be measured in connection with the object may include the time at which an object is created (T1), the time at which an object is first used (T2), the time at which an object is last used (T3), and the time at which the object is garbage collected (T4). When measuring the quantity T1, a line of code associated with an object's allocation may also be noted. Similarly, when measuring the quantity T3, a line of code at which an object is used may also be noted. It is possible to associate the line of code associated with a last use to a particular object to alert a user at a point in a program after which the object is no longer in use by the program. It is after the last object use, such as the last line of code associated with the final T3 measurement, which indicates a point in the code where an object may be subject to garbage collection.

In other words, after a last use of an object in the code, it may be advantageous to subject the object to garbage collection for reuse.

In connection with the foregoing four time measurements T1 through T4, an embodiment may also compute the following metrics:

Object useful existence duration, $D1=T3-T2$

Delayed object use duration, $D2=T2-T1$

Object retention duration, $D3=T4-T3$

Object not used duration, $D4=D3+D2$ $$\text{Memory ratio 1, } \frac{D1}{D2}$$

$$\text{Memory ratio 2, } \frac{D1}{D4}$$

It should be noted that the foregoing metrics, or any one or more thereof, may be used in connection with measurements for object tracking and usage within a program. In the foregoing, metric D1 represents an amount of time associated with what may be characterized as a lifetime of an object with regard to its usage in a program. To capture this aspect, D1 is expressed as a difference between an object's last and first usage within a program or other defined time period. The delayed object use duration metric D2, represents the delay or the amount of time between when an object is created and when it is first used. The object retention duration, D3, represents an amount of time from when an object is last used to when it is discarded or otherwise made available for reuse. The metric object not used duration, D4, may be characterized as an aggregate time of when an object is not used within a program. D4 may be represented as the sum of the time which elapses from when an object is first created to when the object is first used, and adding to that the amount of time from an object's last use to when the object is discarded. The memory ratios 1 and 2 may be characterized as providing measurements in connection with how long an object remains in comparison to a useful lifetime of an object. It is possible that the measurement T2 does not exist indicating that the object has been created but never used.

It should be noted that the unit of time associated with one or more of the measurements may be in standard time units such as seconds, or fractions thereof, since the beginning of program execution. A unit of time as used in connection with any one or more of the foregoing metrics may also be determined as a number of garbage collection cycles that have occurred since the beginning of program execution or other time period. A unit of time may also be expressed as a number of method calls since the beginning of program execution or actual time (wall time). Generally, the unit of time that may be associated with a measurement such as the garbage collection cycle number may vary in accordance with each embodiment. Garbage collection cycles may be used as a measurement by defining a counter which is incremented each time garbage collection processing is performed for a program.

Referring to FIG. 4, a table 100 illustrates a user display that may be presented to a user in connection with collecting and calculating data for objects used in a program. It should be noted that the table 100, or a portion thereof, may be stored in a memory. Values for the table 100 may be determined by software executed in connection with performing an analysis of the one or more objects in a program and the use of those objects during execution of the program. Techniques are described elsewhere herein in connection with obtaining the foregoing measurements illustrated in FIG. 4.

The table 100 may be presented as a result of running standalone software or may be presented in addition to other information provided in connection with other performance measurement software that runs with the system described herein. The other performance measurement software may be part of the system described herein or the system described herein may be a part and/or a feature of the other performance measurement software. For example, system described herein may be used in connection with a tool suite providing other functionalities such as the existing memory leak analysis and/or footprint analysis. Examples of other performance measurement software includes, for example, DEVPARTNER JAVA and DEVPARTNER STUDIO, both of which are products provided by COMPUWARE CORPORATION.

Included in the table 100 is a row of data for each of the objects for which metrics are being tracked. Column 102 may include an object identifier or indicator, such as the name of an object. Columns 104, 106, 108, and 110 correspond, respectively, to metrics D1 through D4 described elsewhere herein. Column 112 corresponds to memory ratio 1 and column 114 corresponds to memory ratio 2 as described elsewhere herein.

The metrics computed for one or more objects may be used in connection with reporting different statistics about objects. For example, the metrics computed for one or more objects as illustrated in the table 100 of FIG. 4 may be used to report about objects never used, objects retained the longest, classes of objects with the longest average retention, objects exceeding a specific retention duration threshold, and the like. Objects which have never been used may be determined, for example, by determining which objects do not have an associated time T2. Objects retained the longest may be determined by searching the table 100 for those objects having the largest D3 metric. The classes of objects having the longest average retention time may be calculated by using the object retention duration D3 and computing an average for all of the particular objects belonging to each class. The highest average associated with a particular class may be identified. Additionally, it is possible to define one or more thresholds as well as other measurements. For example, a retention duration threshold may be specified. The table 100 may be searched to determine which objects have an associated D3 time exceeding the specified duration threshold. In an embodiment herein, the table 100 may be sorted according to values in any of the columns 104, 106, 108, 110, 112, 114, or alphabetically (or otherwise) according to the column 102 containing object names.

It should be noted that the number of classes, objects, thresholds, and the like, may be set using any one or more different techniques that may vary in accordance with different embodiments. For example, one or more parameters may be fixed within a system. Optionally, a system may also provide a mechanism, such as a configuration file or other command line option, by which a user may set one or more of option. Similarly, the particular unit of time or measurement may also be set using these and other techniques familiar to one of ordinary skill in the art.

The measurements associated with the table 100 of FIG. 4 may be taken at various points in time to measure a change in object memory metrics. For example, the metrics may be taken at a first point in time. Subsequently, a code change or correction may be made in order to improve the memory management and efficiency associated with software object use. For example, such suggestions may be made in accordance with objects which are created but never used by changing the points at which an object is garbage collected using the line of code associated with time T3. After making one or more corrections or changes to existing code, the program may again be executed and the metrics may be collected at a subsequent point in time. The second set of metrics may reflect those metrics calculated after the corrections or changes have been made to the code. A delta or difference between the two sets of metrics may be used as a way to quantify or measure a change in memory usage of objects.

Referring to FIG. 5, a table 150 representing the delta values or differences between two sets of metrics associated with different times (e.g., before and after an attempted improvement to the code). Software performing analysis for tracking object usage by a program may store a first set of values such as illustrated by the table 100 of FIG. 4. Subsequently, a second set of values may be obtained at a second point in time and a delta or difference may be provided in the table 150 of FIG. 5.

Note that the particular information that may be included in the tables 100, 150 may vary in form and amount in accordance with different embodiments. The particular objects tracked may vary. For example, in one embodiment, all objects may be tracked by default which are referenced in a program. An embodiment may also provide for selection of one or more objects, or one or more classes of objects, for which tracking is performed. Additionally, there may be variations in connection with which objects are tracked based on what code allocates or creates the object. For example, a user may explicitly create an object and perform other explicit commands within their code for object management and use. It may be desirable from a user's perspective or a programmer's perspective to only track those objects for which the user has control over management thereof. Objects may also be allocated when a user makes a call to third party software. In particular, it may be desirable to have an option to not track such objects created by third party software since a user may have no control over the management of such objects.

The particular objects that are tracked may be defined, for example, through an inclusion list or a defined tracked object list. For example, objects may be tracked as associated with a specific variable or object name space such as a user name space.

In connection with a user program, a programmer may want to know different aspects of object usage within the program such as, for example, a measurement of memory efficiency as determined by metrics and before and after corrections as described elsewhere herein. Additionally, a programmer may want to know if there are objects which have not been disposed of via garbage collection at all, which objects may be disposed of earlier in connection with program execution, and the like. The foregoing data as illustrated in connection with FIG. 4, for example, may be used in connection with providing this and other information to a programmer to facilitate more efficient object use within a program. It is possible to report to the user regarding disposable objects that were not disposed of. It is possible to report on objects instantiated too early in accordance with a predefined threshold. This may be determined, for example, in accordance with D2 values for one or more objects where the D2 value exceeds the threshold. It is also possible to report on one or more objects having the highest memory ratios 1 and 2. These objects having the highest memory ratios may be characterized as objects that have remained in memory for a relatively long time in comparison with their useful lifetime. As also described herein, classes with the longest average retention duration may be determined. Classes whose instances on average have long retention durations may assist a programmer in focusing upon one or more individual classes that may be associated with object retention problems.

As described herein, for each object that is tracked, a line of user code information may be determined with one or more different metrics. For example, a line of user code may be recorded when an object is first allocated, first used, and last used. Such information regarding lines of code may be reported to the user as a hint regarding where a code correction may be warranted. For example, the line of code of where an object was first created and first referenced may be utilized to adjust the point at which an object is created if there is an unneeded gap therebetween. The line of code as to a last use of an object may be used to determine when an object may be available for garbage collection. In addition to the line of user code, an embodiment may also include other source code information such as, for example, source module name, runtime stack information, and the like.

For each object tracked, additional information may also be gathered. For example, an embodiment may include an indicator as to whether the object allocation and/or usage is in user code or other code, such as system code or other third party code.

The measurements T1-T4 may be obtained using any one or more different techniques known to those of ordinary skill in the art. In some instances, one or more callback routines may be invoked at desired points during program execution to gather data. For example, it is possible to use an interface to define a callback routine to be invoked when an object is created or allocated. When a method or routine for object allocation is invoked, the defined callback routine may be invoked. The callback routine may be invoked prior to (prolog) and/or at the end of (epilog) execution of code for object allocation. Similarly, other callback routines may be defined and invoked during program execution. In one embodiment, callback routines may be defined to perform the following operations in connection with an object:
Object creation/allocation:
   If object is to be tracked then record T1
Method Enter/Exit:
   If object is tracked and T2 not set, then set T2
   If object is tracked then set T3
Garbage Collection:
   If object is tracked, then set T4

It is also possible to use an instrumented version of a program so that selected calls, such as for object creation/allocation, method entry/exit, and the like, are intercepted and control is passed to a wrapper or stub function. The wrapper or stub function may collect data, such as times T1-T4 and other data (e.g., source code information), prior to executing code of the intercepted routine. Techniques for instrumenting code are known to those of ordinary skill in the art. In some instances, it is also possible to track when a dispose routine is called, or when any other particular routine is called.

Figure 6A:
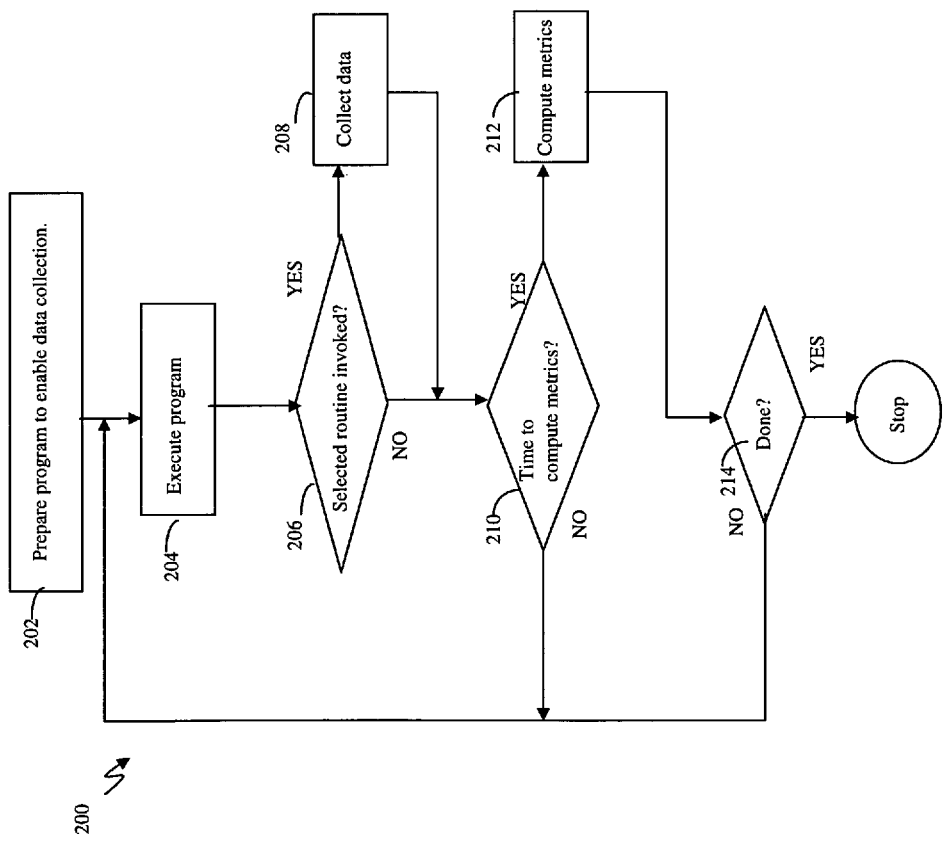
FIG. 6A is a flowchart that illustrates processing steps for an overall process for data collection and metric computation according to an embodiment of the system described herein.

Referring to FIG. 6A, a flowchart 200 illustrates processing steps that may be performed in connection with computing the metrics described herein. The steps of the flowchart 200 correspond to processes described elsewhere herein. Processing begins at a step 202, where the program being monitored is prepared to enable the collection of the data, such as measurements T1-T4 as described herein. The step 202 may include, for example, defining the necessary callbacks, instrumenting the program, or portions thereof, and the like. The processing performed in the step 202 may vary according to specific implementation of the system described herein as well as the nature of the program being monitored. Following the step 202 is a step 204 where the program is executed. Following the step 204 is a step 206 where a determination is made as to whether a selected routine has been invoked for which data is to be gathered (e.g., an object create routine or invocation of an already-created object). If a selected routine has been invoked, then control passes to a step 208 to collect the data. As described elsewhere herein, a callback routine or intercepted call in connection with instrumented code may result in invocation of code which performs the data collection at the step 208.

If it is determined at the step 206 that a selected routine has not been invoked, and no data is to be collected for the currently executed routine, then control proceeds to a step 210. Note that the step 210 is also reached following the step 208. At the step 210, a determination is made as to whether the metrics are to be computed for the collected data. In some instances, metrics may be computed at one or more points during program execution, including possibly at the end of execution. In other instances, the metrics may be computed only at the end of program execution. In some embodiments, a user may be able to select, via an appropriate user interface, when to compute and/or display the metrics.

If it is determined at the step 210 that the metrics are not to be computed, then control passes from the step 210 back to the step 204, described above. Otherwise, control passes from the step 210 to a step 212 to compute the metrics using, for example, formulas described elsewhere herein. Following the step 212 is a step 214, where it is determined whether program execution is complete. If so, program execution stops. Otherwise, control passes from the step 214 back to the step 204, described above, to continue with program execution.

It is possible to perform other processing in connection with gathering other data, for example, if the techniques described herein are used to analyze a program along with other program analysis features. Note also that the processing illustrated by the flow chart 200 may represent invocation of mechanisms described elsewhere herein including stubs, callback routines, etc. so that, for example, the test at the step 206 may correspond to invocation of a callback routine rather than an actual test that is performed.

Referring to FIG. 6B, components 240 that may be used in connection with the object tracking techniques described herein include user code 242, a data recording component 244, libraries/third party code 246, and collected/calculated data 248. Data such as the measurements T1-T4 and source code information may be recorded using code included in the user code 244 where the particular operation and invocation thereof may vary as described elsewhere herein. For example, the user code 244 may include callback routines which gather data, or other stub or wrapper functions to which control is transferred for an intercepted call, such as a routine for which information is gathered (e.g., method entry/exit, object allocation/creation, and the like).

The libraries/third part code 246 may be part of the executable program, but may or may not include the mechanisms described herein for gathering the measurements T1-T4. The collected/calculated data 248 may include the measurements collected and any computed metrics as described herein. It should be noted that the measurements and computed metrics may be stored separately each in memory, on a storage device and the like and/or may be stored in separate memories or may be stored selectively (e.g., storing only T1-T4 and calculating the remaining metrics as needed).

Figure 7A:
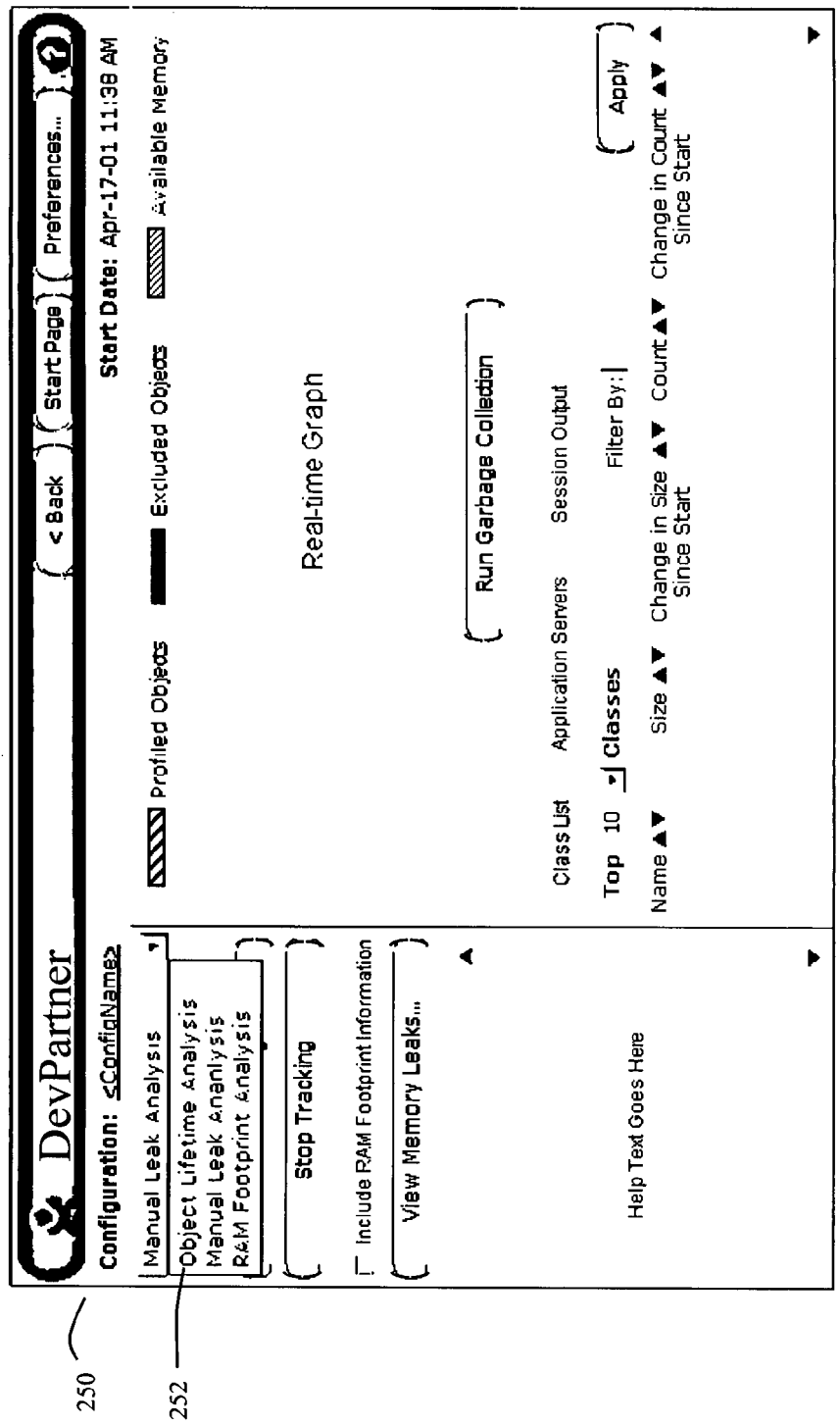
FIGS. 7A, 7B, and 8 are example screen shots that may be displayed in connection with a user interface for object tracking according to an embodiment of the system described herein.
Figure 7B:
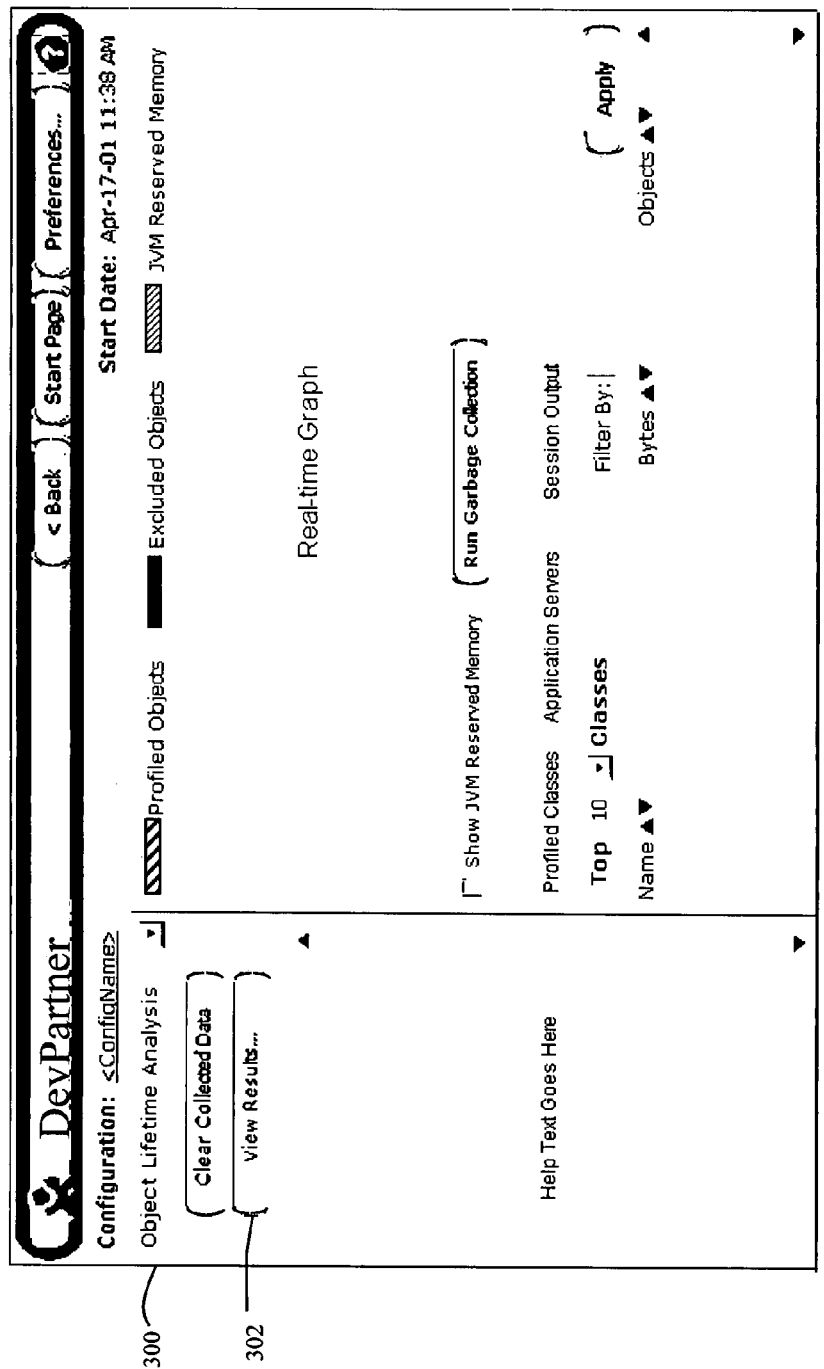

Referring now to FIG. 7A, shown is a screen view 250 that may be displayed as part of a user interface in connection with execution of a program under test. Some time after a user starts a session, the screen view 250 may be displayed to a user. At some point during execution of the program and/or at the end of program execution, for example, the user may select an option 252 to proceed to the object lifetime analysis screen. Upon selection of the option 252, another screen display, such as a screen display 300 of FIG. 7B, may be shown to a user. Data, such as T1-T4 measurements, source code information, and the like, may be collected during execution of the program. Metrics may be calculated and output to a file and/or memory, for example, when the program terminates and/or also in response to a user selection of 302. Subsequently, the data included in the file and/or memory may be displayed to the user in any one of a number of appropriate formats.

Figure 8:
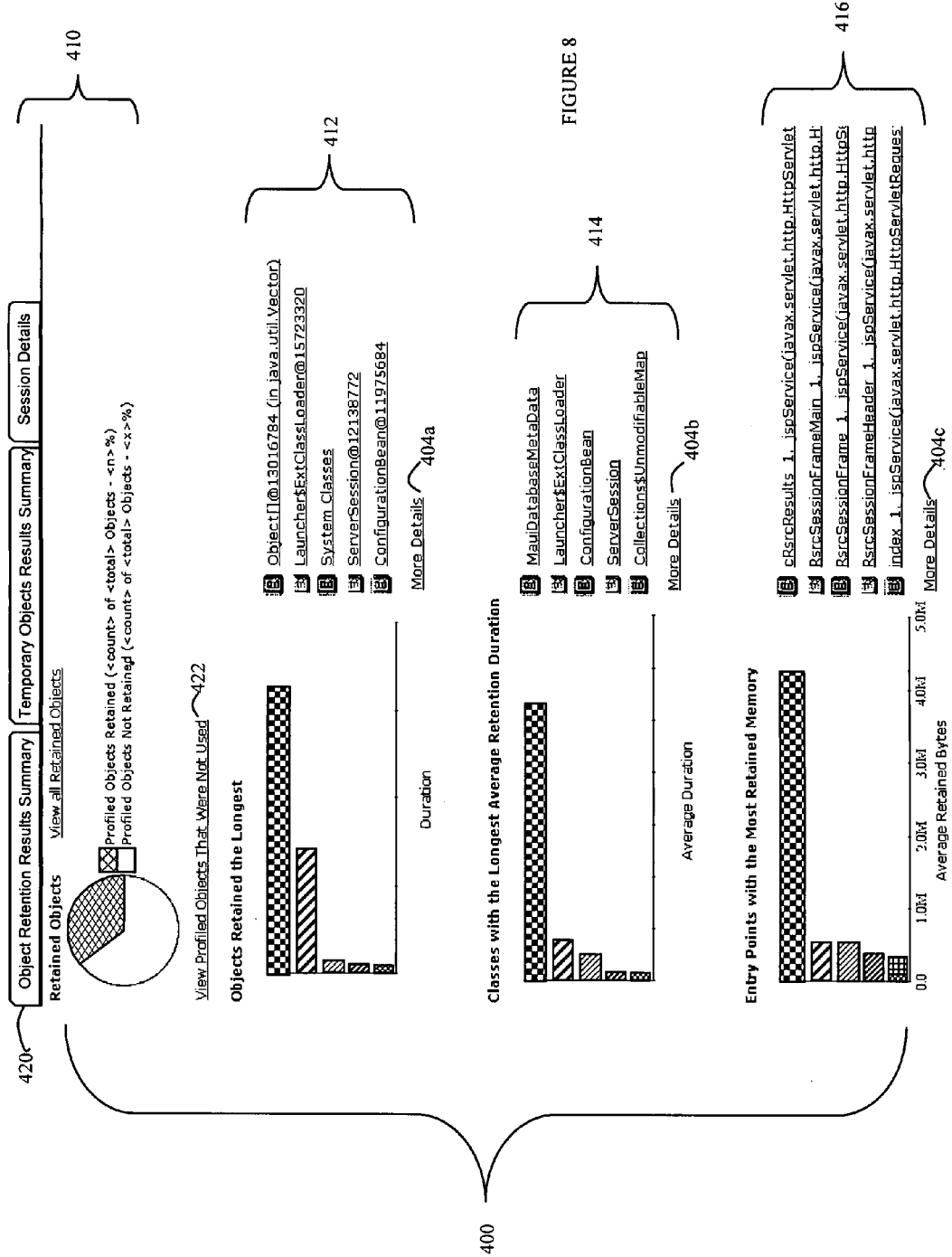

Referring to FIG. 8, graphic display 400 illustrates presentation of the object retention metrics described herein. For example, a retained object may be characterized as an object having a D3 value exceeding a threshold. The threshold may be fixed, user modifiable, etc. The threshold may be in any one of a variety of different units, such as garbage collection cycles, as described herein. An object may be classified as a retained object if, after the object is last used, the object is not garbage collected after a number of garbage collection cycles (or after a number of other units that may be used). The information provided in the graphic display 400 may includes information about retained objects. A section 410 may provide a graphical overview of retained objects for the entire program. If the retained object count is zero, then it may be determined that there are no memory leaks in the program. In some embodiments, an element 422 may be provided as a hyperlink to a list of object instances. In some cases, the element 422 may be displayed only if there are profiled instances having no first usage or no T2 time.

Another element 412 may include a graphical display of objects which have the longest retention time. Code corrections related to objects having the longest retention times may provide the user with the greatest object memory management improvements. Another element 414 may include a graphical display of object classes on average having the longest retention durations. By identifying classes with problems, the user may focus on improvements to a particular class of objects. Another element 416 may include a graphical display of user entry code points that, on average, retain the largest amount of memory. The element 416 illustrates a scalability issue regarding object retention and memory usage. If an entry point retains a lot of memory longer than needed each time the entry point is invoked, there may be a point at which remaining available memory may be exhausted by calling that particular entry point.

Figure 9:
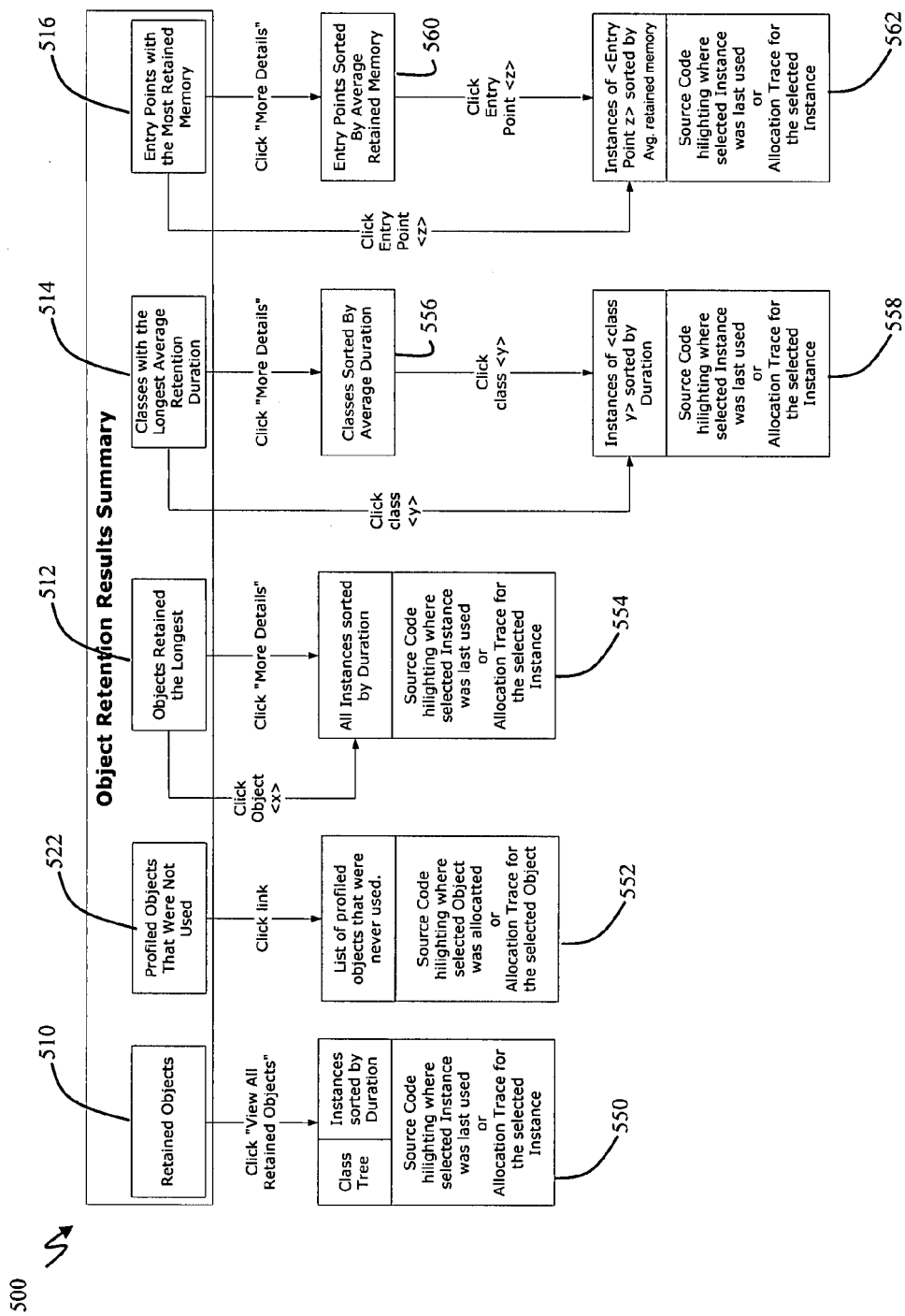
FIG. 9 is an example of data flow paths that may be taken via user interface selections to display program information about objects according to an embodiment of the system described herein.

Referring to FIG. 9, a diagram 500 illustrates data flow paths that may be taken in connection with selection of options and further display of information for the graphic display 400. Each of a plurality of elements 510, 522, 512, 514, 516 defines a flow path that may be taken by a user through other menu selections and options as part of allowing a user to drill down into source code to determine lines of source code to possibly correct. Each of the elements 510, 522, 512, 514, 516 corresponds to at least one of the elements 410, 412, 414, 416 included graphic display 400 of FIG. 8.

The element 510 may be associated with the element 410 of FIG. 8, where selection of the "view all retained objects" 402 of FIG. 8 results in display of information about all retained objects, as illustrated by a box 550. A particular instance may then be selected and source code information regarding when the selected instance is last used may be displayed. The element 522 may be associated with the element 422 of FIG. 8, where selection of the hyperlink 422 of FIG. 8 results in display of a list of profiled object that have never been used 552. Further selection of a particular object may result in source code information displayed for the allocation of the selected object.

The element 512 may be associated with the element 412 of FIG. 8, where selection of the "more details" option 404a of FIG. 8 may result in display of all instances sorted by duration, as illustrated by a box 554. A user may then select a particular object instance about which source code information regarding last use is displayed. The element 514 may be associated with the element 414 of FIG. 8, where selection of the "more details" option 404b of FIG. 8 may result in display of all classes sorted by duration, as illustrated by a box 558. Selection of a particular class may result in display of additional information about objects within the class. The element 516 may be associated with the element 416 of FIG. 8, where selection of the "more details" option 404c of FIG. 8 results in display of entry points sorted by average retained memory, as illustrated by the box 560. Selection of a particular entry may result in display of source code information as to where the selected instance was last used 562.

Figure 10:
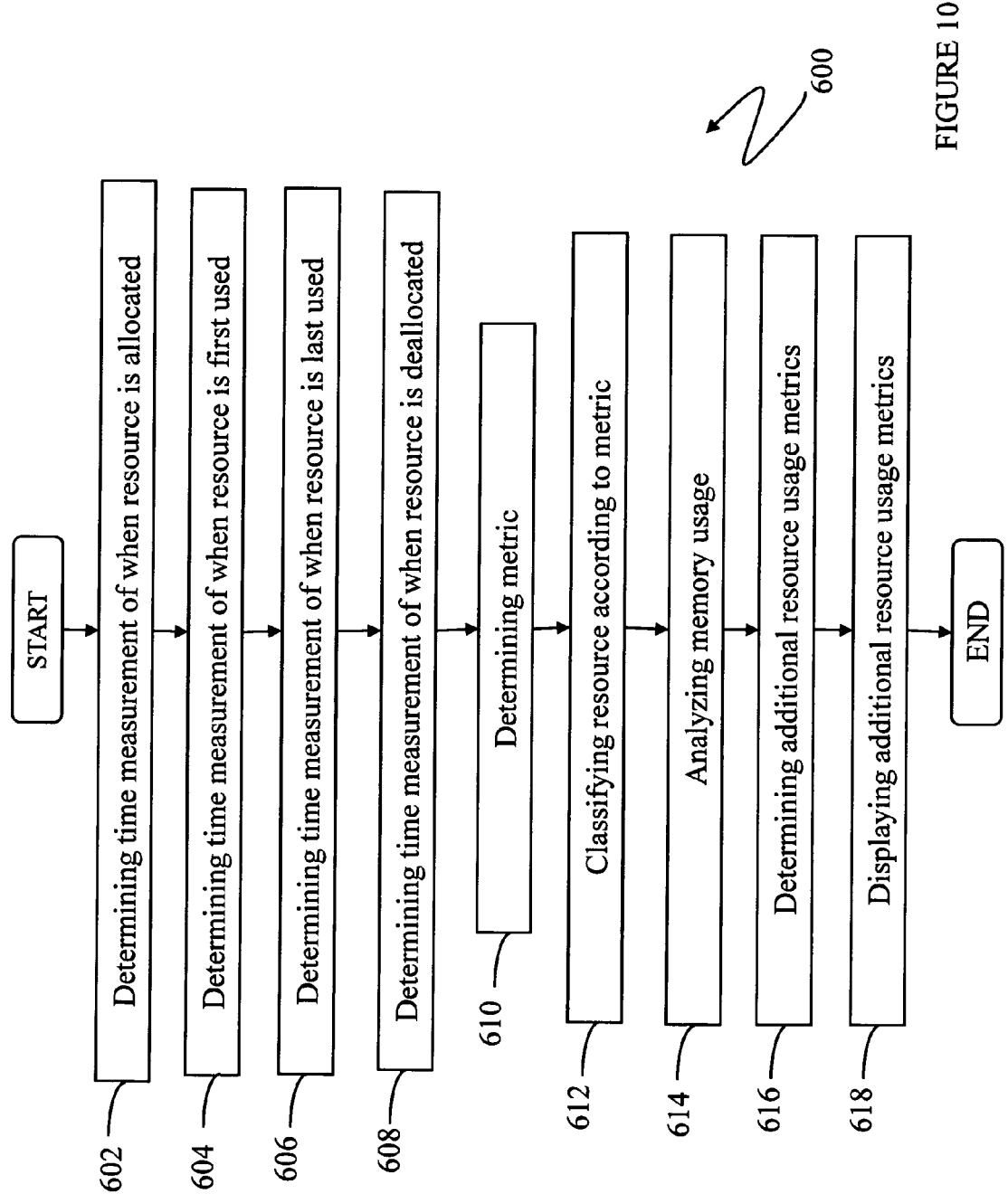
FIG. 10 is a flow diagram of a method of tracking resource use according to an embodiment of the system described herein.

FIG. 10 is a flow diagram 600 of a method of tracking resource use according to an embodiment of the system described herein. At a step 602, a time measurement of when the resource is allocated is determined. At a step 604, a time measurement of when the resource is first used is determined. At a step 606, a time measurement of when the resource is last used is determined. At a step 608, a time measurement of when the resource is deallocated is determined. At a step 610, a metric using at least one of the time measurements is determined. At a step 612, the resource is classified according to the metric, wherein the classifying includes determining if the resource is a retained resource, and wherein the resource is determined as the retained resource if, after the resource is last used, the resource is not deallocated after a threshold time. At a step 614, memory usage information is analyzed in connection with the classifying of the resource. At a step 616, additional resource usage metrics are determined. At a step 618, the additional resource usage metrics are displayed.

The foregoing describes memory analysis techniques and metrics that may be used to automate the process of obtaining memory usage information. In some embodiments, the foregoing may be performed without requiring interactive operations to output different snapshots of memory usage at different points in time during execution. A program may execute and, upon completion of execution, information regarding objects and associated memory usage may be output. A program may be easily and repeatedly executed at different points in time using the techniques described herein.

While the invention has been disclosed in connection with various embodiments, modifications thereon will be readily apparent to those skilled in the art. Accordingly, the spirit and scope of the invention is set forth in the following claims.

What is claimed is:

1. A system to carry out a method of tracking resource use, comprising:
    a general-purpose digital computer programmed to
        determine a time measurement of when the resource is allocated;
        determine a time measurement of when the resource is first used;
        determine a time measurement of when the resource is last used;
        determine a time measurement of when the resource is deallocated;

determine a metric using at least one of the time measurements;

classify the resource according to the metric, wherein the metric includes retention duration corresponding to a difference between the time measurement of when the resource is deallocated and the time measurement of when the resource is last used, wherein the classifying includes determining whether the resource is a retained resource, and wherein the resource is determined as the retained resource when, after the resource is last used the resource is not deallocated after a threshold time; and analyze memory usage information of a computer program that uses the resource in connection with the classifying of the resource, wherein analyzing the memory usage information includes identifying memory leaks in the computer program according to the classifying of the resource as the retained resource and indicating code corrections of the computer program related to the retained resource;

wherein the resource is a software object;

wherein deallocating the resource includes at least one of: setting a flag for the resource and adding an identifier for the resource to a list of resources to be deallocated; and wherein the time measurements correspond to at least one of: a count of garbage collection cycles and a number of method calls since the beginning of program execution.

2. The system, according to claim 1, wherein deallocating the resource is performed automatically by a run time system when there are no remaining references to the object in run time code or variables.

3. The system, according to claim wherein the method further comprising:

determining additional resource usage metrics.

4. The system, according to claim 3, wherein the additional resource usage metrics are provided by-at least one value selected from the group consisting of: object useful existence corresponding to a difference between when the resource is last used and when the resource is first used, delayed object use duration corresponding to a difference between when the resource is first used and when the resource is allocated, an object not used duration corresponding to a sum of the delayed object use duration and the object not used duration, a first memory ratio of the object useful existence duration to the delayed object use duration, and a second memory ratio of the object useful existence duration to the object not used duration.

5. The system, according to claim 4, wherein the method further comprising:

displaying to a user the additional resource usage metrics.

6. The system, according to claim 4, wherein the method further comprising:

determining a first set of the additional resource usage metrics;

determining a second set of the additional resource usage metrics, wherein for each of the usage metrics of the first set, there is a corresponding usage metric of the second set measured at a different time; and displaying to a user a difference between the first set and the second set of additional resource usage metrics.

7. A computer-readable storage medium with executable code stored thereon that tracks resource use, the executable code comprising:

executable code that determines a time measurement of when the resource is allocated:

executable code that determines a time measurement of when the resource is first used;

executable code that determines a time measurement of when the resource is last used;

executable code that determines a time measurement of when the resource is deallocated;

executable code that determines a metric using at least one of the time measurements;

executable code that classifies the resource according to the metric, wherein the metric includes resource retention duration corresponding to a difference between the time measurement of when the resource is deallocated and the time measurement of when the resource is last used, wherein the classifying includes determining whether the resource is a retained resource, and wherein the resource is determined as the retained resource when, after the resource is last used, the resource is not deallocated after a threshold time; and executable code that analyzes memory usage information of a computer program that uses the resource in connection with the classifying of the resource, wherein analyzing the memory usage information includes identifying memory leaks in the computer program according to the classifying of the resource as the retained, resource and indicating code corrections of the computer program related to the retained resource wherein the resource is a software object;

wherein executable code that deallocates the resource is part of a run time system that includes at least one of: executable code that sets a flag for the resource and executable code that adds an identifier for the resource to a list of resources to be deallocated; and wherein the tune measurements correspond to at least one of: a count of garbage collection cycles and a number of method calls since the beginning of program execution.

8. The computer-readable storage medium, according to claim 7, wherein executable code that deallocates the resource is part of a run time system that automatically deallocates the resource when there are no remaining references to the object in run time code or variables.

9. The computer-readable storage medium, according to claim 7, further comprising:

executable code that determines additional resource usage metrics.

10. The computer-readable storage medium, according to claim 9, wherein the additional resource usage metrics are provided by at least one value selected from the group consisting of object useful existence corresponding, to a difference between when the resource is last used and when the resource is first used, delayed object use duration corresponding to a difference between when the resource is first used and when the resource is allocated, an object not used duration corresponding to a sum of the delayed object use duration and the object not used duration, a first memory ratio of the object useful existence duration to the delayed object use duration, and a second memory ratio of the object useful existence duration to the object not used duration.

11. The computer-readable storage medium, according to claim 10, further comprising:

executable code that displays to a user the additional resource usage metrics.

12. The computer-readable storage medium, according to claim 10, further comprising:

executable code that determines a first set of the additional resource usage metrics;

executable code that determines a second set of the additional resource usage metrics, wherein for each of the usage metrics of the first set, there is a corresponding usage metric of the second set measured at a different time; and executable code that displays to a user a difference between the first set and the second set of additional resource usage metrics.

13. The system, according to claim 3, wherein determining the additional resource usage metrics includes determining information of a line of code for at least one of when the resource was first allocated, when the resource was first used, and when the resource was last used.

14. The system, according to claim 13, wherein the resource is a software object and the information of a line of code is determined, when the software object was last used.

15. The computer-readable storage medium, according to claim 9, wherein the executable code that determines additional resource usage metrics includes executable code that determines information of a line of code for at least one of: when the resource was first allocated, when the resource was first used, and when the resource was Last used.

16. The computer-readable storage medium, according to claim 15, wherein the resource is a software object and the information of the line code is determined when the software object was last used.

* * * * *